(12) United States Patent
Huang

(10) Patent No.: US 10,306,690 B2
(45) Date of Patent: May 28, 2019

(54) COMMUNICATION UNDER MULTIPLE COMMUNICATION LINKS

(71) Applicant: Intel Corporation, Santa Clara, CA (US)

(72) Inventor: Jinshi Huang, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/396,182

(22) Filed: Dec. 30, 2016

(65) Prior Publication Data
US 2018/0192450 A1 Jul. 5, 2018

(51) Int. Cl.
*H04W 76/15* (2018.01)
*H04W 4/00* (2018.01)
(Continued)

(52) U.S. Cl.
CPC ............ *H04W 76/15* (2018.02); *H04B 1/385* (2013.01); *H04L 43/16* (2013.01); *H04W 4/00* (2013.01); *H04W 52/00* (2013.01); *H04W 52/0293* (2013.01); *H04W 4/02* (2013.01); *H04W 4/80* (2018.02); *H04W 4/90* (2018.02);
(Continued)

(58) Field of Classification Search
CPC ..... H04W 76/15; H04W 4/80; H04W 76/025; H04W 24/08; H04W 72/0473; H04W 4/008; H04W 4/00; H04W 52/0293; H04W 52/00; H04W 4/90; H04W 4/02; H04W 88/06; H04B 1/385; H04L 43/16; Y02D 70/124; Y02D 70/20; Y02D 70/10; Y02D 70/14; Y02D 70/00; Y02D 70/162; Y02D 70/26; Y02D 70/146; Y02D 70/168; Y02D 70/144; Y02D 70/142; Y02D 70/166; Y02D 70/40; Y02D 70/164; Y02D 70/12
See application file for complete search history.

(56) References Cited

U.S. PATENT DOCUMENTS 9,572,184 B1* 2/2017 Erdogan ................ H04W 12/06
2011/0249558 A1* 10/2011 Raaf ...................... H04W 24/02
370/237
(Continued)

FOREIGN PATENT DOCUMENTS

CN 105516896 A 4/2016
CN 105704647 A 6/2016

*Primary Examiner* — Kwang B Yao
*Assistant Examiner* — Moo Jeong
(74) *Attorney, Agent, or Firm* — Schwabe, Williamson & Wyatt, P.C.

(57) ABSTRACT

Embodiments include apparatuses, methods, and systems including a communication device having a first transceiver to communicate with a first device through a first communication link, and a second transceiver to communicate with a second device through a second communication link. In addition, there may be a third communication link between the first device and the second device. For the communication device, the second transceiver may consume less power for the second communication link than a power the first transceiver consumes to communicate through the first communication link. The communication device may communicate a traffic with the first device via the second device, through the second and third communication links, using the second transceiver. Other embodiments may also be described and claimed.

23 Claims, 10 Drawing Sheets

(51) Int. Cl.
*H04W 52/02* (2009.01)
*H04W 52/00* (2009.01)
*H04B 1/3827* (2015.01)
*H04L 12/26* (2006.01)
*H04W 4/90* (2018.01)
*H04W 4/02* (2018.01)
*H04W 88/06* (2009.01)
*H04W 4/80* (2018.01)
*H04W 24/08* (2009.01)

(52) U.S. Cl.
CPC ............ *H04W 24/08* (2013.01); *H04W 88/06* (2013.01); *Y02D 70/00* (2018.01); *Y02D 70/10* (2018.01); *Y02D 70/12* (2018.01); *Y02D 70/124* (2018.01); *Y02D 70/14* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/20* (2018.01); *Y02D 70/26* (2018.01); *Y02D 70/40* (2018.01)

(56) References Cited

U.S. PATENT DOCUMENTS

| | | |
|---|---|---|
| 2015/0049657 A1 | 2/2015 | Cheng et al. |
| 2016/0100303 A1* | 4/2016 | Kim ................... H04W 76/02 455/426.1 |
| 2017/0064752 A1* | 3/2017 | Veikkolainen ........ H04W 8/005 |
| 2018/0049256 A1* | 2/2018 | Sang ................... H04W 76/15 |

* cited by examiner

COMMUNICATION UNDER MULTIPLE COMMUNICATION LINKS

FIELD

Embodiments of the present invention relate generally to the technical field of communication including both wired and wireless communication, and more particularly to communication under multiple communication links.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Communication between two or more devices may be conducted by wired or wireless communication technology. Wireless communication technology may transfer information or power between two or more devices that are not connected by an electrical conductor. One wireless communication technology may use radio, while other wireless communication technology may use other electromagnetic wireless technologies, such as light, magnetic or electric fields, or the use of sound. Radio wireless communication technology may encompass various types of fixed, mobile, and portable applications, including two-way radios, cellular telephones, personal digital assistants (PDAs), and wireless networking. Other application examples of radio wireless communication technology may include global position system (GPS) units, garage door openers, wireless computer mice, keyboards and headsets, headphones, radio receivers, satellite television, broadcast television, cordless telephones. From cell phones to wireless internet to home and office devices, many applications may be converted from wired into wireless communication. Low power may be an important factor in the design and implementation of various applications for both wired and wireless communication technology.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
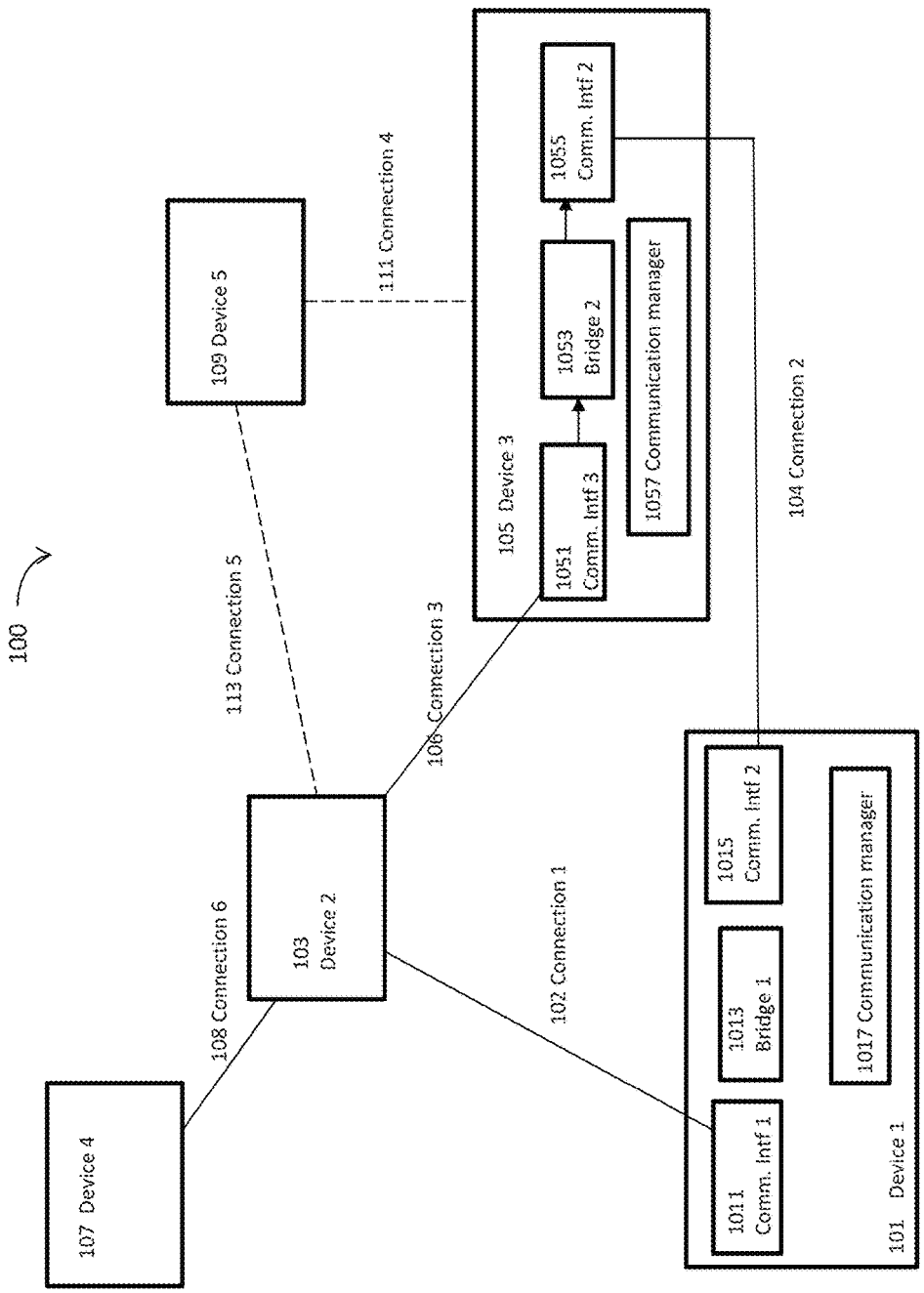
FIG. 1 illustrates an example communication system including multiple devices and multiple communication links, in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Communication between two or more devices may be conducted by wired or wireless communication technology. Low power may be an important factor in the design and implementation of various applications for both wired and wireless communication technology. With the proliferation of various communication technologies, many devices may support more than one communication technology. Multiple devices may communicate through multiple communication links in different communication technology. In embodiments, a device may be referred to as a communication device, while a link may be referred to as a communication link as well.

Embodiments herein may include a communication device, having a first transceiver to communicate with a first device through a first communication link, and a second transceiver to communicate with a second device through a second communication link. In addition, there may be a third communication link between the first device and the second device. For the communication device, the second transceiver may consume less power for the second communication link than a power the first transceiver consumes to communicate through the first communication link. The communication device may include a communication manager coupled to the first transceiver and the second transceiver, where the communication manager may communicate a traffic with the first device via the second device, through the second and third communication links, using the second transceiver. Since the second transceiver may consume less power, hence the communication device may save power by communicating a traffic with the first device using the second transceiver instead of using the first transceiver and the first communication link between the communication device and the first device.

Embodiments herein may include a communication device, having a first transceiver to communicate with a first device through a first communication link, and a second transceiver to communicate with a second device through a second communication link. In addition, the first device may communicate with the second device through a third communication link. In embodiments, the first device may consume more power to communicate with the second device on the third communication link than a power the first device may consume to communicate with the communication device on the first communication link. The communication device may further include a communication manager coupled to the first transceiver and the second transceiver. When the communication device receives a first traffic from the first device through the first communication link, the communication manager may forward the first traffic from the first device to the second device on the second communication link. Additionally, when the communication device receives a second traffic from the second device through the second communication link, the communication manager may forward the second traffic to the first device on the first communication link. In this way, the first device may communicate with the second device through the communication device, without using the third communication link between the first device and the second device. Since the first device may consume more power to communicate with the second device on the third communication link, the first device may save power by communicating with the second device through the communication device.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

FIG. 1 illustrates an example communication system 100 including multiple devices, e.g., a device 101, a device 103, a device 105, a device 107, and a device 109, and multiple links (or connections), e.g., a link 102, a link 104, a link 106, a link 108, a link 111, and a link 113, communicatively coupling the devices 101, 103, 105, 107 and 109, in accordance with various embodiments. In particular, the device 101 may include a communication manager 1017, and the device 105 may include a communication manager 1057, to manage communication under the multiple communication links.

In embodiment, a link, e.g., the link 102, the link 104, the link 106, the link 108, the link 111, and/or the link 113, may be a communications channel that connects two or more communicating devices. A link, e.g., the link 102, the link 104, the link 106, the link 108, the link 111, and/or the link 113, may be an actual physical link or it may be a logical link that uses one or more actual physical links. For example, a link may be any suitable wireless connection. In embodiments, a link, e.g., the link 102, the link 104, the link 106, the link 108, the link 111, and/or the link 113, may be a cellular communication link, a near field communication (NFC) link, an evolved universal terrestrial radio access network (EUTRAN) communication link, a wireless metropolitan area networks (WMAN) communication link, a wireless local area network (WLAN) communication link, a wireless personal area network (WPAN) communication link, a mobile body area networks (MBAN) communication link, an infrared communication link, a satellite communication link, a Bluetooth® communication link, a ZigBee communication link, a Z-Wave communication link, a worldwide interoperability for microwave access (WiMAX) communication link, or others.

In embodiments, for the system 100, a wired link may be used together with wireless links. For example, the link 102 may be a wireless link, while the link 104 may be a wired link. Additionally or alternatively, the link 102 and the link 104 may be wireless links, while the link 111 may be a wired link. Different links may use a same or different communication technology. For example, the link 102 may use a wireless cellular technology, the link 104 may use a different wireless technology, such as Bluetooth®, while the link 106 may use a wired communication technology.

In embodiments, a communication traffic (hereinafter simply, traffic) may be communicated through a link. For example, a traffic may be communicated from the device 101 to the device 103 through the link 102. A traffic may be a command traffic, a data traffic, a voice traffic, or a multimedia traffic. In embodiments, a traffic may be a sequence of packets from a source device to a destination device, sent by point to point, multicast, or broadcast. In embodiment, a traffic may be a transfer of any amount of data or information from one device to another. A traffic may be a packet of bits or bytes, or a stream of continuous transfer of data or information.

In embodiment, the device 101, the device 103, the device 105, the device 107, and/or the device 109 may be a wired or wireless communication device. For example, the device 101, the device 103, the device 105, the device 107, and/or the device 109 may be a wearable device, a smartphone, a computer tablet, a laptop, a desktop computer, a server, a game console, a set-top box, an infotainment console, an Internet of Things (IoT) device, a sensor, or others.

In embodiments, the device 101 may include a first communication interface 1011, a bridge 1013, a second communication interface 1015, and the communication manager 1017. A communication interface, e.g., the first communication interface 1011 and/or the second communication interface 1015 may include a network interface card, a transceiver, a modem, or so forth. In embodiments, a communication interface may be referred to as a transceiver, or a modem. The device 105 may include a first communication interface 1051, a bridge 1053, a second communication interface 1055, and the communication manager 1057. Similarly, the first communication interface 1051 and/or the second communication interface 1055 may include a network interface card, a wireless transceiver, a modem, and so forth.

In embodiments, for the device 101, the first communication interface 1011 may send and/or receive information for the link 102 between the device 101 and the device 103, and the second communication interface 1015 may send and/or receive information for the link 104 between the device 101 and the device 105. Furthermore, for the device 105, the first communication interface 1051 may send and/or receive information for the link 106 between the device 105 and the device 103, while the second communication interface 1055 may coordinate with the second communication interface 1015 of the device 101 to send and/or receive information for the link 104 between the device 101 and the device 105.

In embodiments, for the device 101, the link 102 may use a first communication technology through the first communication interface 1011, and the link 104 may use a second communication technology through the second communication interface 1015. The bridge 1013 may be used to convert data or information between the first communication interface 1011 and the second communication interface 1015 within the device 101. Therefore, the device 101 may support two different kinds of communication technologies in different links.

In embodiments, for the device 101 with multiple communication interfaces, e.g., the first communication interface 1011 and the second communication interface 1015, the second communication interface 1015 for the link 104 may consume less power than a power the first communication interface 1011 consumes to communicate through the link 102.

In embodiments, for the device 101, the communication manager 1017 may manage communication over the links for the device, e.g., the link 102 and/or the link 104. The communication manager 1017 may be coupled to the first communication interface 1011 and the second communication interface 1015. The communication manager 1017 may manage traffics on the links, e.g., the link 102 and the link 104, and treat different traffic in different way. For example, the communication manager 1017 may turn on or off the entire link, e.g., the link 102 or the link 104, by turning on or off the communication interfaces. Additionally or alternatively, the communication manager 1017 may communicate one traffic for one link and another traffic for another link, for various purposes, such as to save power, to increase the speed, or increase the throughput.

In embodiments, when the second communication interface 1015 for the link 104 may consume less power than a power the first communication interface 1011 consumes to communicate through the link 102, the communication manager 1017 may communicate a traffic from the device 101 to the device 103 via the device 105. In more detail, a traffic may be communicated from the device 101 to the device 105 through the link 104, followed by the link 106 from the device 105 to the device 103, notwithstanding the fact that the device 101 could have sent the traffic to the device 103 through link 102. Hence, the device 101 may save power by communicating the traffic via the device 105 through the link 104, followed by the link 106 from the device 105 to the device 103, compared to communicating the traffic directly with the device 103 through the link 102.

In embodiments, the communication manager 1017 may manage traffic individually, so that different traffic may follow different links. In embodiments, the communication manager 1017 may communicate another traffic from the device 101 to the device 103 through the link 102. For example, a multimedia traffic, which may use a large amount of power, may follow the link 104 and the link 106 from the device 101 to the device 103. On the other hand, an emergency or security traffic may often be a few bytes or packets of data, where the difference in power consumption may be small for the different communication interfaces. In embodiments, the communication manager 1017 may communicate an emergency or security traffic through the link 102 from the device 101 to the device 103, or from the device 103 to the device 101, without going through the device 105.

In embodiments, the communication manager 1057 of the device 105 may be coupled to the first communication interface 1051 and the second communication interface 1055. The communication manager 1057 may manage traffics on the links, e.g., the link 104 and the link 106. For example, the communication manager 1057 may forward a traffic to the device 103 on the link 106, where the traffic may be from the device 101 through the link 104. Additionally, the communication manager 1057 may forward a traffic to the device 101 through the link 104, where the traffic may be from the device 103 through the link 106.

In embodiments, the communication between the device 105 and the device 103 may be through other devices. For example, the device 105 may communicate with the device 109 by the link 111, and the device 109 may communicate with the device 103 by the link 113. The communication manager 1057 may forward a traffic to the device 103 via the device 109, through the link 111 and the link 113, and receive a traffic from the device 103 via the device 109, through the link 113 and the link 111.

Figure 2:
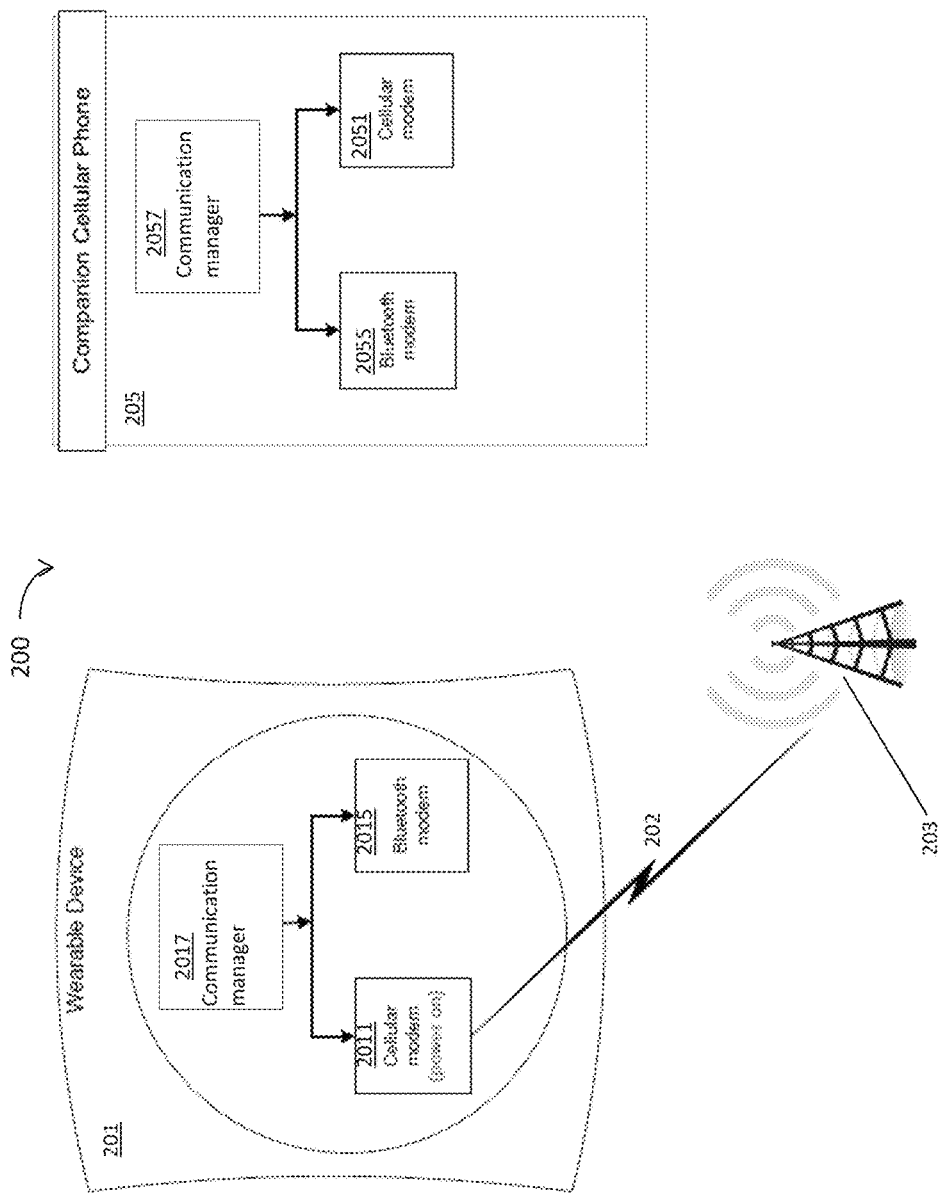
FIGS. 2-3 illustrate example wireless communication systems including a wearable device, a base station, and a companion cellular phone, in accordance with various embodiments.

FIG. 2 illustrates an example wireless communication system 200 including a wearable device 201, a base station 203, and a companion cellular phone 205, in accordance with various embodiments. The system 200 may be an example of the system 100 shown in FIG. 1. For example, the wearable device 201 may be an example of the device 101, the base station 203 may be an example of the device 103, and the companion cellular phone 205 may be an example of the device 105.

Wearable devices, e.g., the wearable device 201, may be gaining popularities. In some embodiments, a wearable device may include a communication interface for cellular technology, in addition to a communication interface for local connections such as Bluetooth®, to extend the reach of the wearable device.

In embodiments, the wearable device 201 may include a first communication interface 2011, which may be a cellular modem. The wearable device 201 may also include a second communication interface 2015, which may be a Bluetooth® modem. In addition, the wearable device 201 may include a communication manager 2017 coupled to the first communication interface 2011 and the second communication interface 2015. There may be other components in the wearable device 201, e.g., a bridge between the first communication interface 2011 and the second communication interface 2015, not shown for simplicity reasons.

In embodiments, the wearable device 201 may include two communication interfaces, e.g., a Bluetooth® modem and a cellular modem. In some other embodiments, there may be other forms of wireless or wired communication interfaces for the wearable device. For example, instead of having a Bluetooth® modem, the wearable device 201 may have a communication interface for one of ZigBee, Z-Wave, NFC, or WiMAX technologies.

The companion cellular phone 205 may include a first communication interface 2051, which may be a cellular modem. The companion cellular phone 205 may also include a second communication interface 2055, which may be a Bluetooth® modem. In addition, the companion cellular phone 205 may include a communication manager 2057 coupled to the first communication interface 2051 and the second communication interface 2055. There may be other components in the companion cellular phone 205, e.g., a bridge between the first communication interface 2051 and the second communication interface 2055, not shown for simplicity reasons.

There may be a link 202 between the wearable device 201 and the base station 203. The wearable device 201 may communicate with the base station 203 through the link 202 using a cellular technology. For the wearable device 201 with a communication interface for cellular technology, e.g., first communication interface 2011, the power consumption may be a problem for the wearable device 201 as the battery capacity of the wearable device 201 may be smaller than the power capacity of a mobile phone, due to the physical constraints of a wearable device. Therefore, a wearable device with the communication interface 2011 for cellular technology may create a less satisfactory user experience.

In embodiments, a wearable device may communicate with a companion mobile phone through a communication interface for local connections such as Bluetooth®, e.g., the communication interface 2015, where the power consumption for the communication interface for local connections such as Bluetooth® may be smaller than the power consumption for the communication interface for cellular technology.

Figure 3:
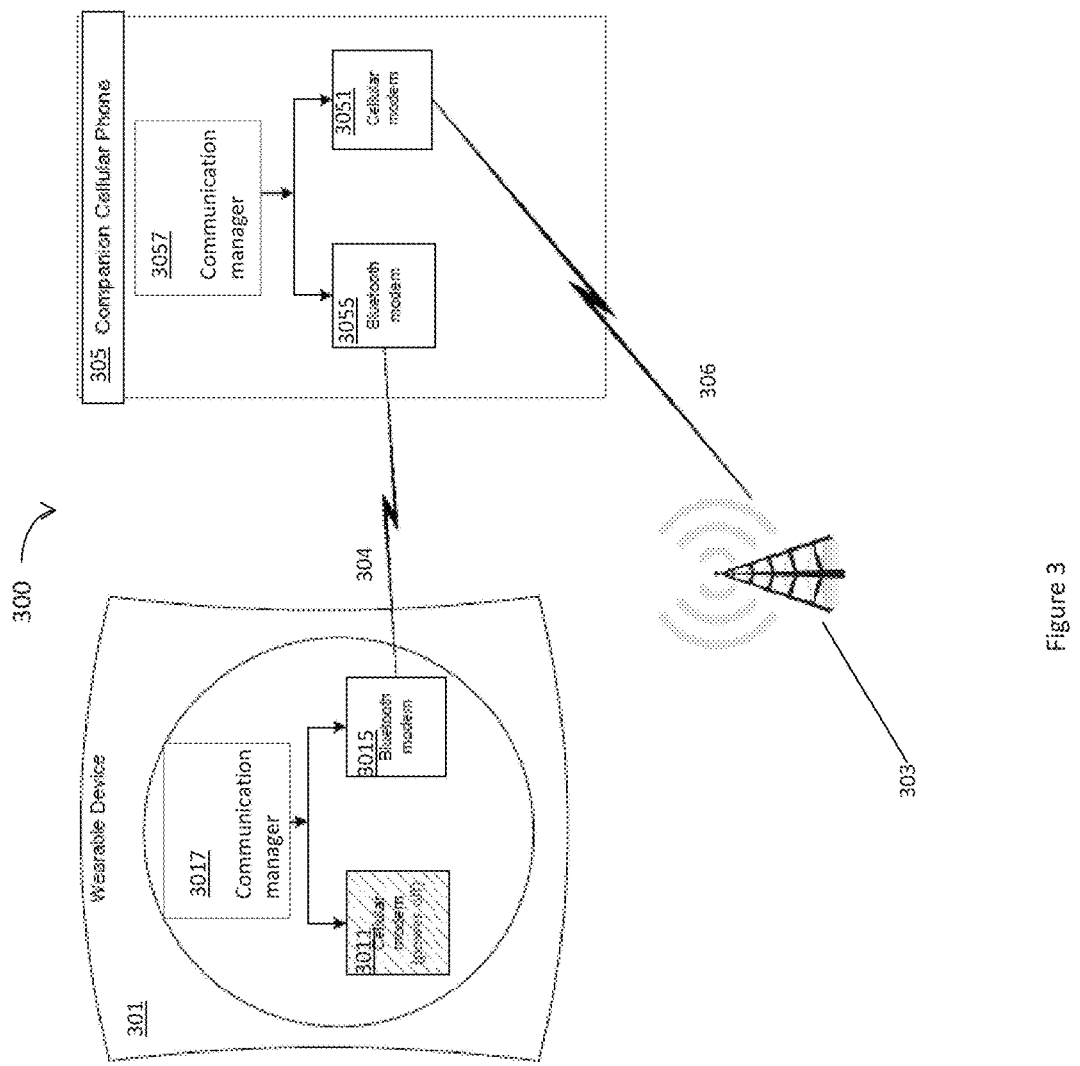

FIG. 3 illustrates an example wireless communication system 300 including a wearable device 301, a base station 303, and a companion cellular phone 305, in accordance with various embodiments. The system 300 may be an example of the system 100 shown in FIG. 1. For example, the wearable device 301 may be an example of the device 101, the base station 303 may be an example of the device 103, and the companion cellular phone 305 may be an example of the device 105. In addition, the system 300 may be similar to the system 200 shown in FIG. 2.

The wearable device 301 may include a first communication interface 3011, which may be a cellular modem. The wearable device 301 may also include a second communication interface 3015, which may be a Bluetooth® modem. In addition, the wearable device 301 may include a communication manager 3017 coupled to the first communication interface 3011 and the second communication interface 3015.

The companion cellular phone 305 may include a first communication interface 3051, which may be a cellular modem. The companion cellular phone 305 may also include a second communication interface 3055, which may be a Bluetooth® modem. In addition, the companion cellular phone 305 may include a communication manager 3057 coupled to the first communication interface 3051 and the second communication interface 3055.

In embodiments, there may be a link 304 between the wearable device 301 and the companion cellular phone 305, coupling the second communication interface 3015 of the wearable device 301 and the second communication interface 3055 of the companion cellular phone 305. The wearable device 301 and the companion cellular phone 305 may communicate through the link 304 in Bluetooth® technology. In addition, there may be a link 306 between the companion cellular phone 305 and the base station 303, so that the companion cellular phone 305 and the base station 303 may communicate through the link 306 in any cellular technology.

In embodiments, the communication manager 3017 and/or the communication manager 3057, individually or in combination, may offload some traffic between the wearable device 301 and the base station 303 to the companion cellular phone 305 when the wearable device 301 may be coupled to the companion cellular phone 305. The communication manager 3017 and/or the communication manager 3057 may implement an intelligent scheme to turn off the first communication interface 3011, e.g., a cellular modem, on the wearable device 301 dynamically based on a power policy to conserve power for the wearable device 301.

Figure 4:
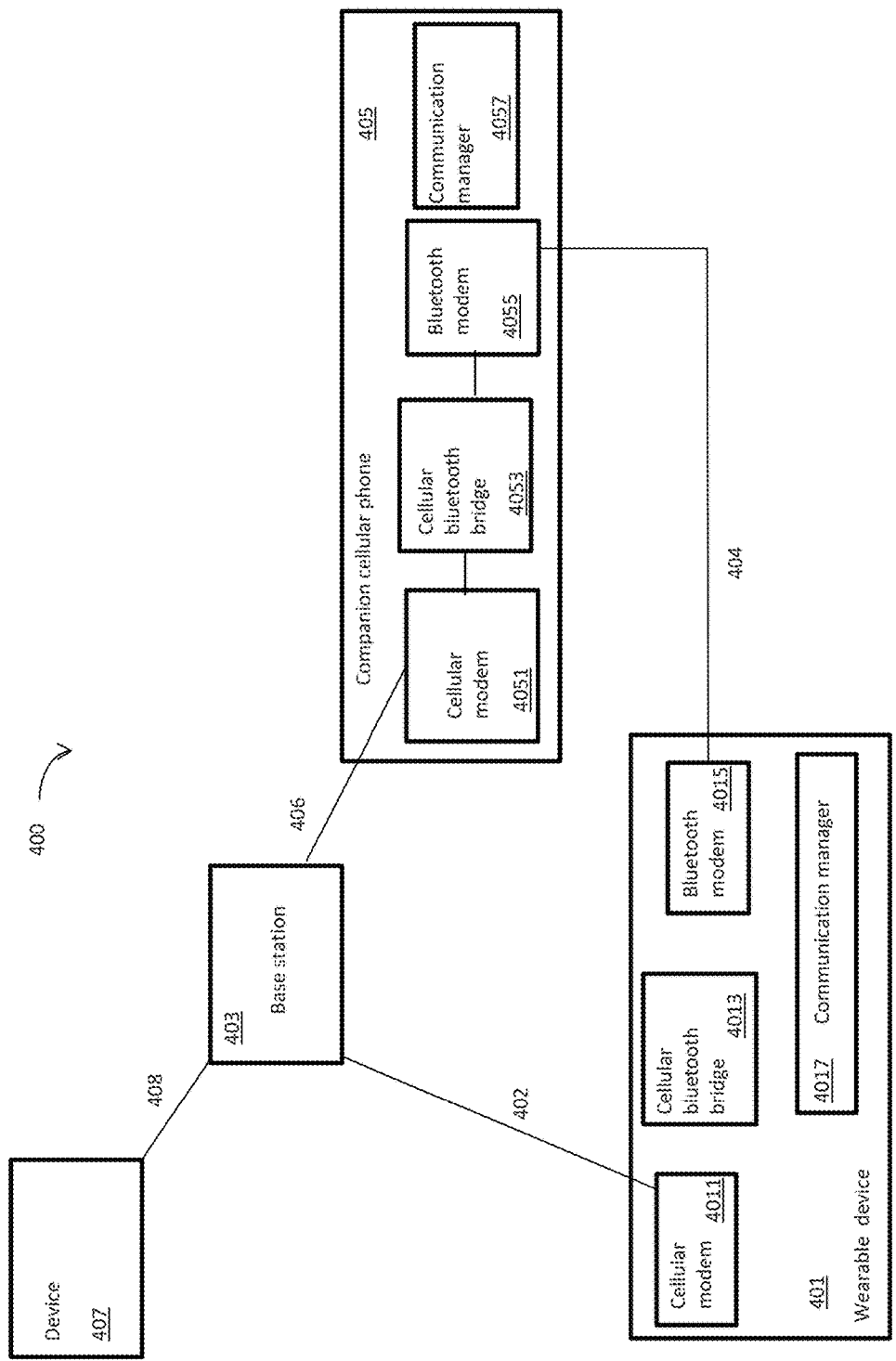
FIG. 4 illustrates an example wireless communication system including a base station, a wearable device, a companion cellular phone, and another device, in accordance with various embodiments.

FIG. 4 illustrates an example wireless communication system 400 including a wearable device 401, a base station 403, a companion cellular phone 405, and a device 407, in accordance with various embodiments. The system 400 may be an example of the system 100 shown in FIG. 1. For example, the wearable device 401 may be an example of the device 101, the base station 403 may be an example of the device 103, the companion cellular phone 405 may be an example of the device 105, and the device 407 may be an example of the device 107.

The wearable device 401 may include a first communication interface 4011, which may be a cellular modem, and a second communication interface 4015, which may be a Bluetooth® modem. In addition, the wearable device 401 may include a bridge 4013, which may be a bridge between a cellular modem and a Bluetooth® modem, and a communication manager 4017 coupled to the first communication interface 4011 and the second communication interface 4015. The companion cellular phone 405 may include a first communication interface 4051, which may be a cellular modem, a second communication interface 4055, which may be a Bluetooth® modem. In addition, the companion cellular phone 405 may include a bridge 4053, which may be a bridge between a cellular modem and a Bluetooth® modem, and a communication manager 4057 coupled to the first communication interface 4051 and the second communication interface 4055. The device 407 and/or the base station 403 may include similar components as the wearable device 401 or the companion cellular phone 405, not shown for simplicity reasons. The device 407 may be another cellular phone, or a cloud server for data.

The link 402 between the base station 403 and the wearable device 401 may be a cellular link. The link 404 between the wearable device 401 and the companion cellular phone 405 may be a Bluetooth® link coupled through the communication interface 4015 and the communication interface 4055. The link 406 between the base station 403 and the companion cellular phone 405 may be a cellular link. The link 408 between the base station 403 and the device 407 may be a cellular link.

Figure 5:
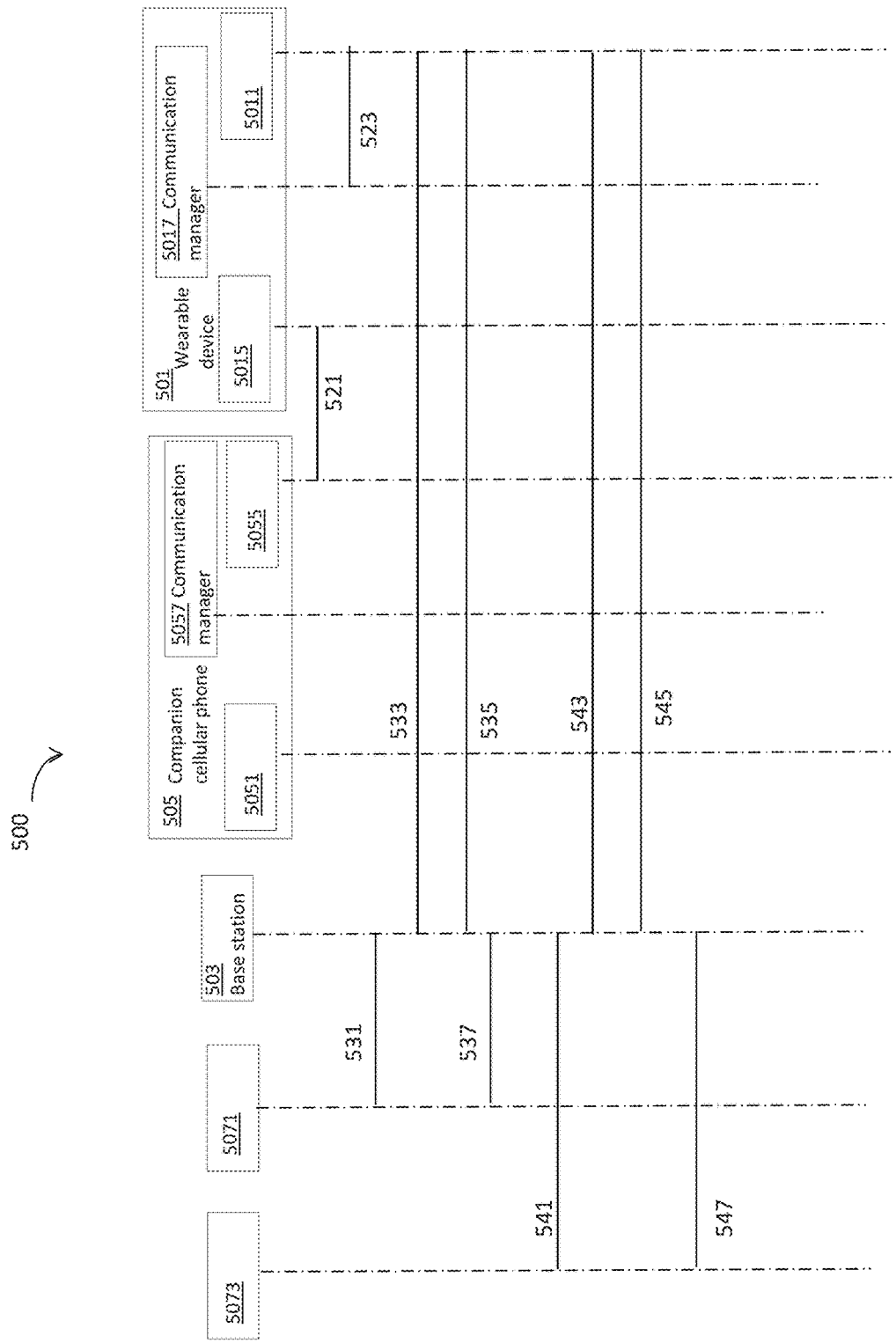
FIG. 5 illustrates an example process of data and voice communications between a wearable device, a base station, a companion cellular phone, and another device, which the present communication management technology may improve in accordance with various embodiments.

FIG. 5 illustrates an example process 500 of data and voice communications between a wearable device 501, a base station 503, a companion cellular phone 505, and another device, e.g., another phone 5073, or a cloud server 5071, which the present communication management technology may improve in accordance with various embodiments. The components shown in FIG. 5 may be an example of the system 100 shown in FIG. 1. For example, the wearable device 501 may be an example of the device 101, the base station 503 may be an example of the device 103, the companion cellular phone 505 may be an example of the device 105, and another phone 5073, or the cloud server 5071 may be an example of the device 107. The process 500 may be performed by the system 400 shown in FIG. 4. For example, the wearable device 501 may be similar to the wearable device 401, the base station 503 may be similar to the base station 403, the companion cellular phone 505 may be similar to the companion cellular phone 405, and another phone 5073, or the cloud server 5071 may be similar to the device 407.

The wearable device 501 may include a first communication interface 5011, which may be a cellular modem, and a second communication interface 5015, which may be a Bluetooth® modem. In addition, the wearable device 501 may include a communication manager 5017. The companion cellular phone 505 may include a first communication interface 5051, which may be a cellular modem, a second communication interface 5055, which may be a Bluetooth® modem. In addition, the wearable device 505 may include a communication manager 5057.

The process 500 may start at interaction 521. At interaction 521, the companion cellular phone 505 may be disconnected from the wearable device 501. At interaction 523, the communication manager 5017 within the wearable device 501 may turn on the first communication interface 5011.

At interaction 531, the cloud server 5071 may send data downlink to the base station 503. At interaction 533, the base station 503 may send data downlink to the wearable device 501. On the other hand, at interaction 535, the wearable device 501 may send data uplink to the base station 503. At interaction 537, the base station 503 may send data uplink to the cloud server 5071.

Similarly, for voice communication, at interaction 541, another phone 5073 may communicate with the base station 503. At interaction 543, the base station 503 may communicate with the wearable device 501. On the other hand, at interaction 545, the wearable device 501 may communicate with the base station 503. At interaction 537, the base station 503 may communicate with another phone 5073.

Communications shown in interactions 531-537 and/or interactions 541-547 may use cellular links and may consume more power for the wearable device 501. The communication manager 5017 and the communication manager 5057, individually or in combination, may switch traffics through the companion cellular phone 505, as demonstrated in FIGS. 6-8 below.

Figure 6:
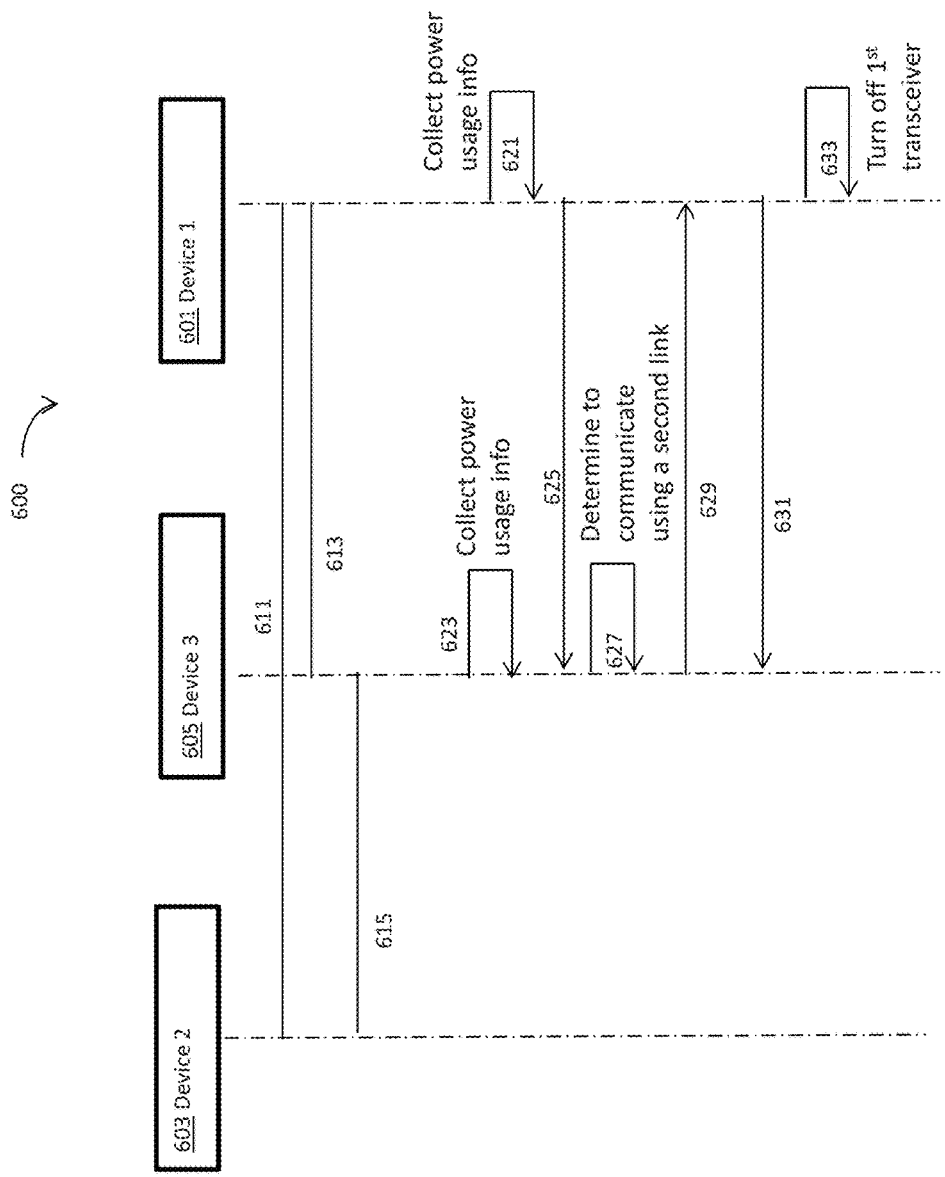
FIGS. 6-7 illustrate example processes for managing multiple communication links between multiple devices, in accordance with various embodiments.

FIG. 6 illustrates an example process 600 for managing multiple links between multiple devices, a device 601, a device 603, and a device 605, in accordance with various embodiments. The process 600 may be applied to the system 100, where the device 601 may be similar to the device 101, the device 603 may be similar to the device 103, and the device 605 may be similar to the device 105, as shown in FIG. 1.

The process 600 may start at interaction 611. At interaction 611, a first link, e.g., the link 102 as shown in FIG. 1, may be established between the device 601 and the device 603. At interaction 613, a second link, e.g., the link 104 as shown in FIG. 1, may be established between the device 601 and the device 605. At interaction 615, a third link, e.g., the link 106 as shown in FIG. 1, may be established between the device 603 and the device 605.

In embodiments, for the device 601 with multiple links, e.g., the first link between the device 601 and the device 603 established at the interaction 611, and the second link between the device 601 and the device 605 established at the interaction 613, the communication interface of the device 601 for the first link may consume more power than the second link does.

Furthermore, at interaction 621, the device 601 may collect a first power usage information of the device 601. At interaction 623, the device 605 may collect a second power usage information of the device 605. At interaction 625, the device 601 may send the first power usage information of the device 601 to the device 605.

At interaction 627, the device 605, or a communication manager within the device 605, may determine, based on the first power usage information of the device 601, and the second power usage information of the device 605, to communicate a traffic by the second link established at the interaction 613 followed by the third link established at the interaction 615, instead of communicating the traffic by the first link established at the interaction 611. Such a determination made at interaction 627 of using the second link followed by the third link may be for various purposes and reasons. For example, in some embodiments, the determination may be made because the communication interface of the device 601 for the first link may consume more power than the communication interface of the device 601 for the second link does. In some other embodiments, such a determination may be made to simply conserve power for the device 601 regardless which communication interface may consume more power. In embodiments, the device 605 may make the determination based on a policy related to the first power usage information of the device 601, and the second power usage information of the device 605. In addition, the policy may be related to a first user experience on the first link established at interaction 611, and a second user experience on the second link established at interaction 613. For example, the policy may be to communicate the traffic by the second link established at interaction 613 followed by the third link established at interaction 615 when the first power usage information of the device 601 may indicate that a power level of the device 601 may be below a first threshold, while the second power usage information may indicate a power level of the device 605 may be above a second threshold. At the meantime, a signal quality on the second link established at interaction 613 may be stronger than a third threshold. For example, the single quality may be measured by received signal strength indicator (RSSI). In embodiments, the first threshold, the second threshold, or the third threshold may be configurable by a user of the device 601 or the device 605.

At interaction 629, the device 605 may send the determination to communicate on the second link to the device 601. At interaction 631, the device 601 may start to communicate with the device 605 following the second link. At interaction 633, the device 601 may turn off the communication interface for the first link. In some embodiments, the interaction 633 may be performed before the interaction 631, hence, the device 601 may turn off the communication interface for the first link before communicating the traffic with the device 605. In some other embodiments, the interaction 633 may be performed after the interaction 631, hence, the device 601 may turn off the communication interface for the first link after communicating the traffic with the device 605 has started.

Figure 7:
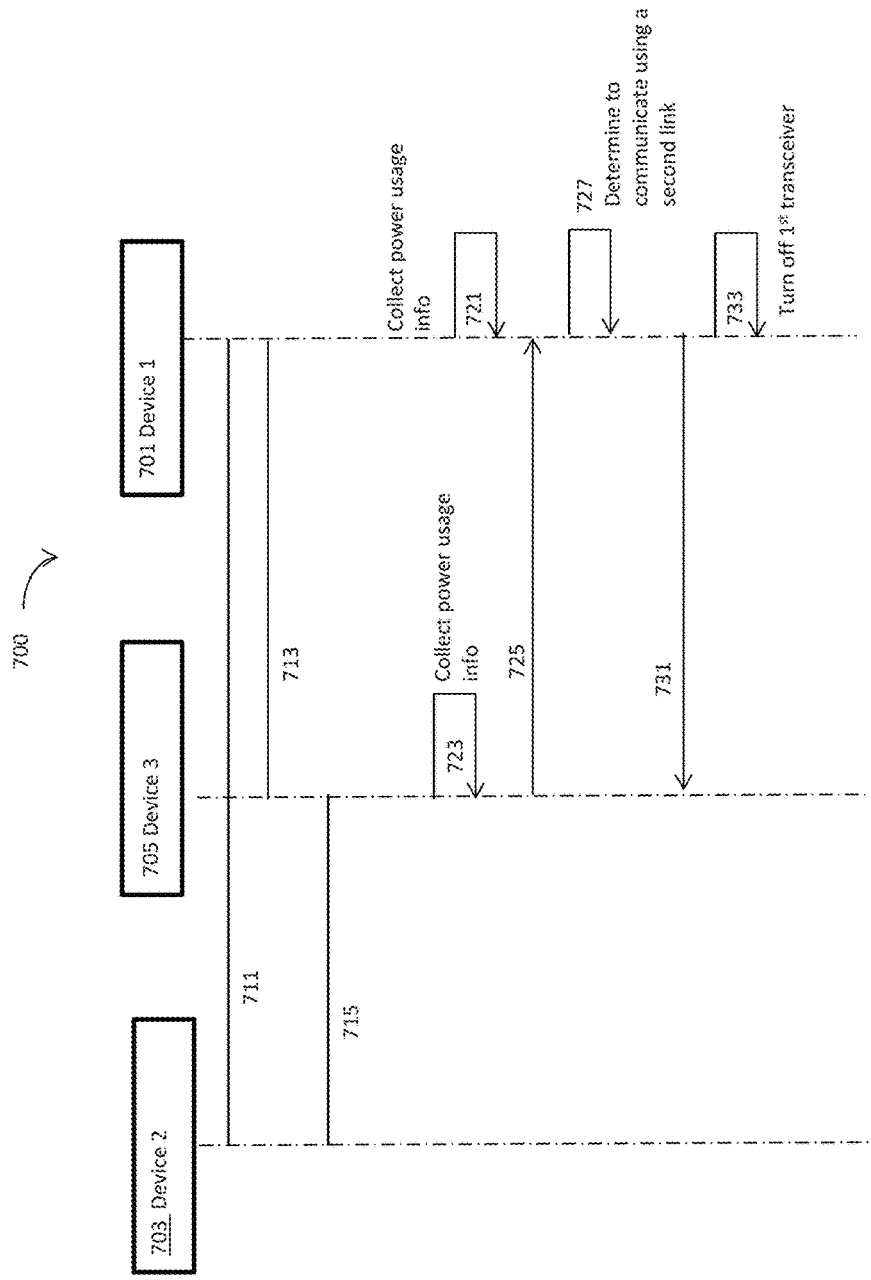

FIG. 7 illustrates an example process 700 for managing multiple links between multiple devices, a device 701, a device 703, and a device 705, in accordance with various embodiments. The process 700 may be applied to the system 100, where the device 701 may be similar to the device 101, the device 703 may be similar to the device 103, and the device 705 may be similar to the device 105, as shown in FIG. 1. The process 700 may be similar to the process 600, except that the device 701 may determine to communicate a traffic via the device 705 to reach the device 703 instead of communicating the traffic directly by a link between the device 701 and the device 703.

The process 700 may start at interaction 711. At interaction 711, a first link, e.g., the link 102 as shown in FIG. 1, may be established between the device 701 and the device 703. At interaction 713, a second link, e.g., the link 104 as shown in FIG. 1, may be established between the device 701 and the device 705. At interaction 715, a third link, e.g., the link 106 as shown in FIG. 1, may be established between the device 703 and the device 705.

In embodiments, for the device 701 with multiple links, e.g., the first link between the device 701 and the device 703 established at the interaction 711, and the second link between the device 701 and the device 705 established at the interaction 713, the communication interface of the device 701 for the first link may consume more power than the second link does.

Furthermore, at interaction 721, the device 701 may collect a first power usage information of the device 701. At interaction 723, the device 705 may collect a second power usage information of the device 705. At interaction 725, the device 705 may send the second power usage information of the device 705 to the device 701.

At interaction 727, the device 701, or a communication manager within the device 701, may determine, based on the first power usage information of the device 701, and the second power usage information of the device 705, to communicate a traffic by the second link established at the interaction 713 followed by the third link established at the interaction 715, instead of communicating the traffic by the first link established at the interaction 711, because the communication interface of the device 701 for the first link may consume more power than the second link does. In embodiments, the device 701 may make the determination based on a policy related to the first power usage information of the device 701, and the second power usage information of the device 705. In addition, the policy may be related to a first user experience on the first link established at interaction 711, and a second user experience on the second link established at interaction 713. For example, the policy may be to communicate the traffic by the second link established at interaction 713 followed by the third link established at interaction 715 when the first power usage information of the device 701 may indicate that a power level of the device 701 may be below a first threshold, while the second power usage information may indicate a power level of the device 705 may be above a second threshold. At the meantime, a signal on the second link established at interaction 713 may be stronger than a third threshold. In embodiments, the first threshold, the second threshold, or the third threshold may be configurable by a user of the device 701 or the device 705.

At interaction 731, the device 701 may start to communicate with the device 705 following the second link. At interaction 733, the device 701 may turn off the communication interface for the first link. In some embodiments, the interaction 733 may be performed before the interaction 731, hence, the device 701 may turn off the communication interface for the first link before communicating the traffic with the device 705. In some other embodiments, the interaction 733 may be performed after the interaction 731, hence, the device 701 may turn off the communication interface for the first link after communicating the traffic with the device 705 has started.

Figure 8:
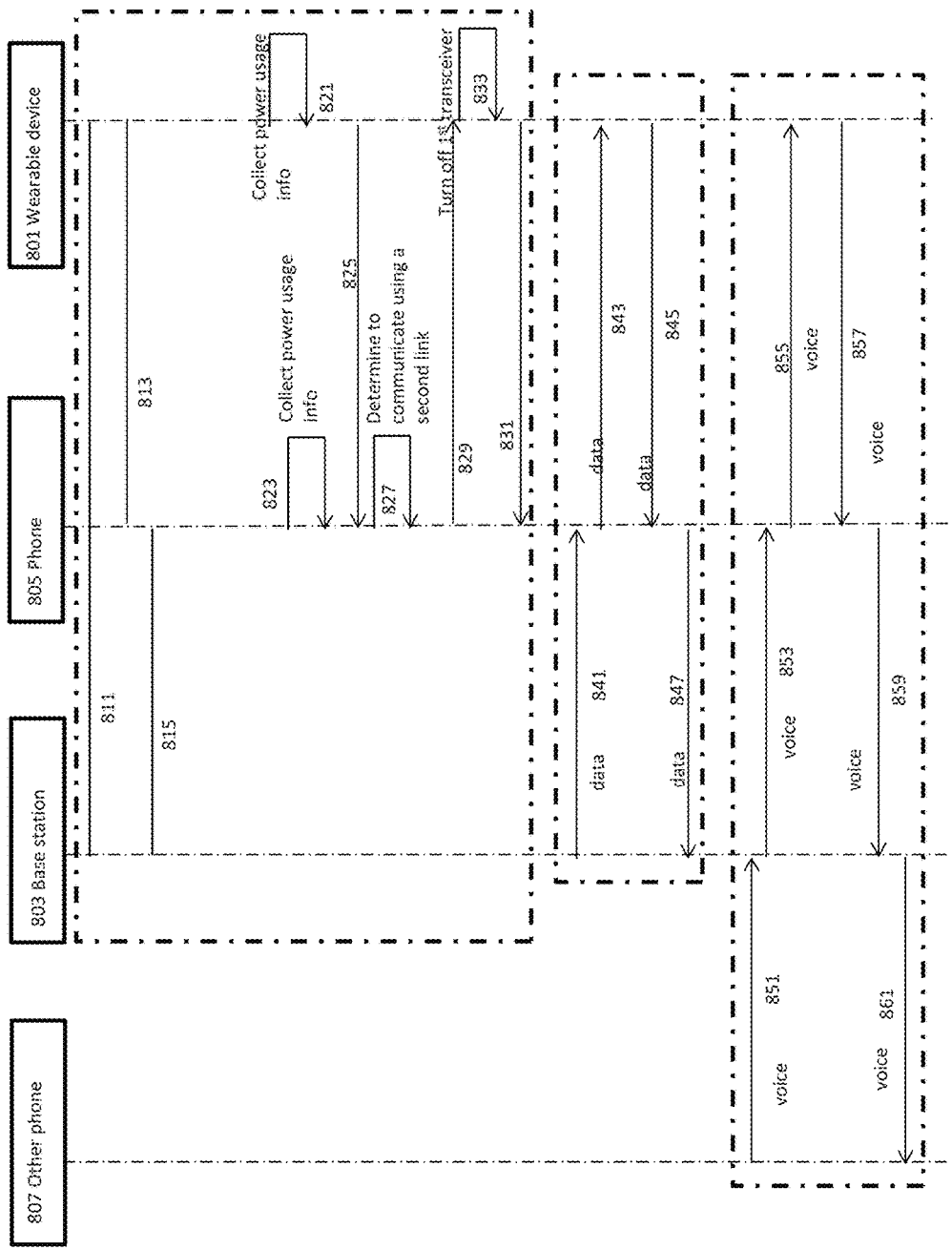
FIG. 8 illustrates an example process for managing multiple wireless communication links, in accordance with various embodiments.

FIG. 8 illustrates an example process 800 of data and voice communications between a wearable device 801, a base station 803, a companion cellular phone 805, and another phone 807, in accordance with various embodiments. The process 800 may be applied to the system 100, where the wearable device 801 may be an example of the device 101, the base station 803 may be an example of the device 103, the companion cellular phone 805 may be an example of the device 105, and another phone 807 may be an example of the device 107, as shown in FIG. 1. Similarly, the process 800 may be applied to the system 400 shown in FIG. 4.

The process 800 may start at interaction 811. During the interaction 811 to interaction 833, the process 800 may be performed similarly to the process 600, or the process 700. For example, at interaction 811, a first link may be established between the wearable device 801 and the base station 803. At interaction 813, a second link may be established between the wearable device 801 and the companion cellular phone 805. At interaction 815, a third link may be established between the base station 803 and the companion cellular phone 805.

Furthermore, at interaction 821, the wearable device 801 may collect a first power usage information of the wearable device 801. At interaction 823, the companion cellular phone 805 may collect a second power usage information of the companion cellular phone 805. At interaction 825, the wearable device 801 may send the first power usage information of the wearable device 801 to the companion cellular phone 805.

At interaction 827, the companion cellular phone 805 may determine to communicate a traffic by the second link established at the interaction 813 followed by the third link established at the interaction 815, instead of communicating the traffic by the first link established at the interaction 811. At interaction 829, the companion cellular phone 805 may send the determination to communicate on the second link to the wearable device 801. At interaction 831, the wearable device 801 may start to communicate with the companion cellular phone 805 following the second link. At interaction 833, the wearable device 801 may turn off the communication interface for the first link. In embodiments, the interaction 833 may be performed before or after the interaction 831.

At interaction 841, the base station 803 may send data downlink to the companion cellular phone 805. At interaction 843, the companion cellular phone 805 may forward data to the wearable device 501. On the other hand, at interaction 845, the wearable device 801 may send data uplink to the companion cellular phone 805. At interaction 847, the companion cellular phone 805 may forward data uplink to the base station 803.

Similarly, for voice communication, at interaction 851, another phone 807 may communicate with the base station 803. At interaction 853, the base station 803 may communicate with the companion cellular phone 805. At interaction 855, the companion cellular phone 805 may communicate with the wearable device 801. On the other hand, at interaction 857, the wearable device 801 may communicate with the companion cellular phone 805. At interaction 859, the companion cellular phone 805 may communicate with the base station 803. At interaction 861, the base station 803 may communicate with another phone 807.

Communications shown in interactions 841-847 and/or interactions 851-861 may use a link between the wearable device 801 and the companion cellular phone 805, instead of using a link between the wearable device 801 and the base station 803. The link between the wearable device 801 and the companion cellular phone 805 may consumes less power, hence the wearable device 801 may save power by communicating with the companion cellular phone 805 instead of communicating with the base station 803 directly.

Figure 9:
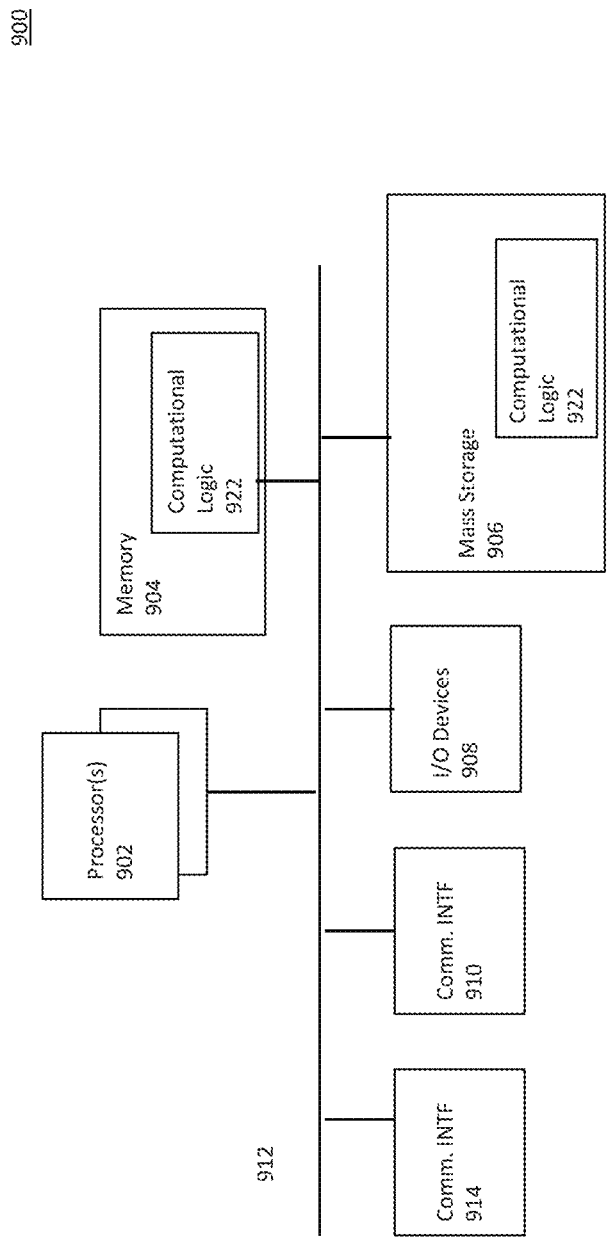
FIG. 9 illustrates an example communication device suitable for use to practice various aspects of the present disclosure, in accordance with various embodiments.

FIG. 9 illustrates an example communication device 900 that may be suitable as a device to practice selected aspects of the present disclosure. As shown, the device 900 may include one or more processors 902, each having one or more processor cores, and a system memory 904. Additionally, the device 900 may include mass storage devices 906 (such as diskette, hard drive, compact disc read only memory (CD-ROM) and so forth), input/output devices 908 (such as display, keyboard, cursor control and so forth) and communication interfaces 910 and 914. The elements may be coupled to each other via system bus 912, which may represent one or more buses. In the case of multiple buses, they may be bridged by one or more bus bridges (not shown).

Each of these elements may perform its conventional functions known in the art. In particular, system memory 904 and mass storage devices 906 may be employed to store a working copy and a permanent copy of the programming instructions implementing the operations associated with managing multiple communication links as described in connection with FIGS. 1-8, and/or other functions, collectively referred to as computational logic 922. The various elements may be implemented by assembler instructions supported by processor(s) 902 or high-level languages, such as, for example, C, that can be compiled into such instructions.

The number, capability and/or capacity of these elements 902-914 may vary, depending on whether the device 900 is used as a mobile device, a stationary device or a server. When use as mobile device, the capability and/or capacity of these elements 902-914 may vary, depending on whether the mobile device is a wearable device, a smartphone, a computing tablet, an ultrabook or a laptop. Otherwise, the constitutions of elements 902-914 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system."

Figure 10:
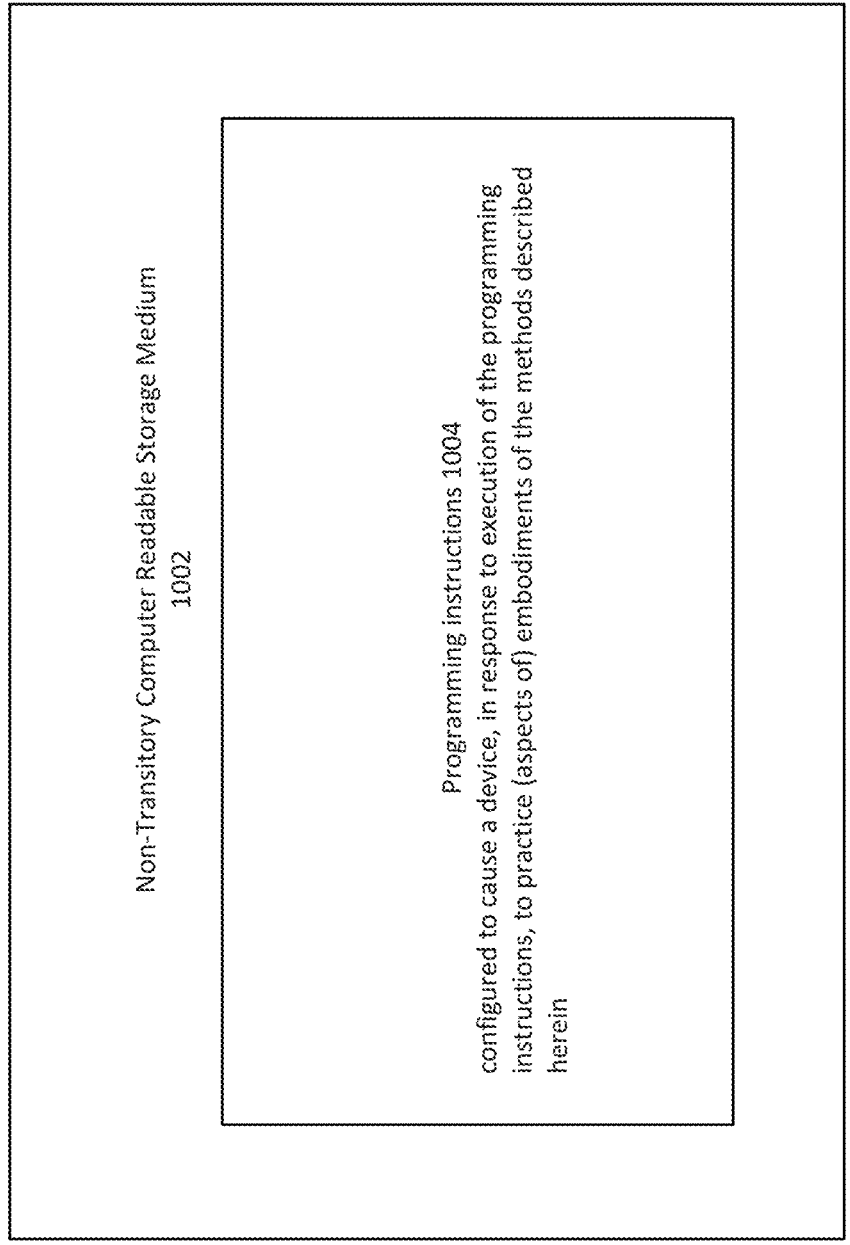
FIG. 10 illustrates a storage medium having instructions for practicing methods described with references to FIGS. 1-9, in accordance with various embodiments.

Furthermore, the present disclosure may take the form of a computer program product embodied in any tangible or non-transitory medium of expression having computer-usable program code embodied in the medium. FIG. 10 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1002 may include a number of programming instructions 1004. Programming instructions 1004 may be configured to enable a device, e.g., device 900, in response to execution of the programming instructions, to perform, e.g., various operations associated with communication manager 1017, or 1057, as shown in FIG. 1.

In alternate embodiments, programming instructions 1004 may be disposed on multiple computer-readable non-transitory storage media 1002 instead. In alternate embodiments, programming instructions 1004 may be disposed on computer-readable transitory storage media 1002, such as, signals. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include a communication device, comprising: a first transceiver to communicate with a first device through a first communication link; a second transceiver to communicate with a second device through a second communication link, wherein the second device communicates with the first device through a third communication link, and the second transceiver for the second communication link consumes less power than a power the first transceiver consumes to communicate through the first communication link; and a communication manager coupled to the first transceiver and the second transceiver to: communicate a traffic with the first device via the second device, through the second and third communication links, using the second transceiver.

Example 2 may include the communication device of example 1 and/or some other examples herein, wherein the first communication link, the second communication link, or the third communication link is a cellular communication link, a near field communication (NFC) link, an evolved universal terrestrial radio access network (EUTRAN) communication link, a wireless metropolitan area networks (WMAN) communication link, a wireless local area network (WLAN) communication link, a wireless personal area network (WPAN) communication link, a mobile body area networks (MBAN) communication link, an infrared communication link, a satellite communication link, a Bluetooth® communication link, a ZigBee communication link, a Z-Wave communication link, or a worldwide interoperability for microwave access (WiMAX) communication link.

Example 3 may include the communication device of example 1 and/or some other examples herein, wherein the traffic is a data traffic, a voice traffic, or a multimedia traffic.

Example 4 may include the communication device of example 1 and/or some other examples herein, wherein the communication device is a wearable device, a smartphone, a computer tablet, a laptop, a desktop computer, a server, a game console, a set-top box, an infotainment console, an Internet of Things (IoT) device, or a sensor.

Example 5 may include the communication device of example 1 and/or some other examples herein, wherein the communication manager is further to: turn off the first transceiver and the first communication link, before communicating the traffic with the first device via the second device using the second transceiver.

Example 6 may include the communication device of any of examples 1-5 and/or some other examples herein, wherein the communication manager is further to: collect a power usage information of the communication device; send the power usage information to the second device; and obtain an indication from the second device to communicate the traffic by the second communication link followed by the third communication link, before communicating the traffic by the second communication link followed by the third communication link.

Example 7 may include the communication device of example 1 and/or some other examples herein, wherein the communication manager is further to: collect a first power usage information of the communication device; obtain a second power usage information of the second device; and determine, based on the first power usage information and the second power usage information, to communicate the traffic by the second communication link followed by the third communication link, before communicating the traffic by the second communication link followed by the third communication link.

Example 8 may include the communication device of example 1 and/or some other examples herein, wherein the communication manager is to determine to communicate the traffic by the second communication link followed by the third communication link based on a policy related to the first power usage information of the communication device, the second power usage information of the second device, a first user experience on the first communication link, and a second user experience on the second communication link.

Example 9 may include the communication device of example 8 and/or some other examples herein, wherein the policy is to communicate the traffic by the second communication link followed by the third communication link when the first power usage information indicates a first power level of the communication device is less than a first threshold, the second power usage information indicates a second power level of the second device is larger than a second threshold, and a signal on the second communication link is stronger than a third threshold.

Example 10 may include the communication device of example 9 and/or some other examples herein, wherein the first threshold, the second threshold, or the third threshold is configurable by a user of the communication device.

Example 11 may include the communication device of any of examples 1-5 and/or some other examples herein, wherein the traffic is a first traffic, the communication manager is to communicate the first traffic with the first device by the second communication link followed by the third communication link, and the communication manager is further to: communicate a second traffic with the first device by the first communication link.

Example 12 may include a communication device, comprising: a first transceiver to communicate with a first device through a first communication link; a second transceiver to communicate with a second device through a second communication link, wherein the first device communicates with the second device through a third communication link, and the first device consumes more power to communicate with the second device on the third communication link than a power the first device consumes to communicate with the communication device on the first communication link; and a communication manager coupled to the first transceiver and the second transceiver to: forward a first traffic to the second device on the second communication link, wherein the first traffic is from the first device through the first communication link; and forward a second traffic to the first device on the first communication link, wherein the second traffic is from the second device through the second communication link.

Example 13 may include the communication device of example 12 and/or some other examples herein, wherein the first communication link, the second communication link, or the third communication link is a cellular communication link, a near field communication (NFC) link, an evolved universal terrestrial radio access network (EUTRAN) communication link, a wireless metropolitan area networks (WMAN) communication link, a wireless local area network (WLAN) communication link, a wireless personal area network (WPAN) communication link, a mobile body area networks (MBAN) communication link, an infrared communication link, a satellite communication link, a Bluetooth® communication link, a ZigBee communication link, a Z-Wave communication link, or a worldwide interoperability for microwave access (WiMAX) communication link.

Example 14 may include the communication device of example 12 and/or some other examples herein, wherein the communication device is a wearable device, a smartphone, a computer tablet, a laptop, a desktop computer, a server, a game console, a set-top box, an infotainment console, an Internet of Things (IoT) device, or a sensor.

Example 15 may include the communication device of example 12 and/or some other examples herein, wherein the communication manager is further to: collect a power usage information of the communication device; send the power usage information to the first device; and obtain an indication from the first device to forward the first traffic from the first device and to forward the second traffic to the first device.

Example 16 may include the communication device of any of examples 12-15 and/or some other examples herein, wherein the communication manager is further to: collect a first power usage information of the communication device; obtain a second power usage information of the first device; and determine, based a policy related to the first power usage information, the second power usage information, a first user experience on the first communication link, and a second user experience on the third communication link, to forward the first traffic from the first device and to forward the second traffic to the first device.

Example 17 may include the communication device of example 16 and/or some other examples herein, wherein the policy is to forward the first traffic from the first device and to forward the second traffic to the first device when the first power usage information indicates a first power level of the communication device is larger than a first threshold, the second power usage information indicates a second power level of the first device is less than a second threshold, and a signal on the first communication link is stronger than a third threshold.

Example 18 may include the communication device of any of examples 12-15 and/or some other examples herein, wherein the communication device communicates with a third device by a fourth communication link, and the third device communicates with the second device by a fifth communication link, and the communication manager is further to: forward the first traffic to the second device via the third device, through the fourth and fifth communication links, and wherein the second traffic is from the second device via the third device, through the fourth and fifth communication links.

Example 19 may include one or more non-transitory computer-readable media comprising instructions that cause a communication device, in response to execution of the instructions by the communication device, to: communicate a traffic with a first device by a second communication link followed by a third communication link, wherein the second communication link is between the communication device and a second device, the third communication link is between the second device and the first device, a first communication link is between the communication device and the first device, the communication device consumes more power to communicate with the first device on the first communication link to the first device than a power the communication device consumes to communicate with the second device on the second communication link.

Example 20 may include the one or more non-transitory computer-readable media of example 19 and/or some other examples herein, wherein the communication device is further caused to: turn off the first communication link between the communication device and the first device, before communicating the traffic with the first device by the second communication link followed by the third communication link.

Example 21 may include the one or more non-transitory computer-readable media of example 19 and/or some other examples herein, wherein the communication device is further caused to: collect a power usage information of the communication device; send the power usage information to the second device; and obtain an indication from the second device to communicate the traffic by the second communication link followed by the third communication link.

Example 22 may include the one or more non-transitory computer-readable media of example 19 and/or some other examples herein, wherein the communication device is further caused to: collect a first power usage information of the communication device; obtain a second power usage information of the second device; and determine, based a policy related to the first power usage information, the second power usage information, a first user experience on the first communication link, and a second user experience on the third communication link, to communicate the traffic by the second communication link followed by the third communication link.

Example 23 may include the one or more non-transitory computer-readable media of any of examples 19-22 and/or some other examples herein, wherein the policy is to communicate the traffic by the second communication link followed by the third communication link when the first power usage information indicates a first power level of the communication device is less than a first threshold, the second power usage information indicates a second power level of the second device is larger than a second threshold, and a signal on the second communication link is stronger than a third threshold.

Example 24 may include the one or more non-transitory computer-readable media of example 23 and/or some other examples herein, wherein the first threshold, the second threshold, or the third threshold is configurable by a user of the communication device.

Example 25 may include the one or more non-transitory computer-readable media of any of examples 19-22 and/or some other examples herein, wherein the traffic is a first traffic, and the communication device is caused to communicate the first traffic with the first device by the second communication link followed by the third communication link, and the communication device is caused further to: communicate a second traffic with the first device by the first communication link.

Example 26 may include a communication device, comprising: means for communicating with a first device through a first communication link; means for communicating with a second device through a second communication link, wherein the second device communicates with the first device through a third communication link, and the means for communicating with the second device for the second communication link consumes less power than a power the means for communicating with the first device consumes to communicate through the first communication link; and means for communicating a traffic with the first device via the second device, through the second and third communication links, using the means for communicating with the second device.

Example 27 may include the communication device of example 26 and/or some other examples herein, wherein the first communication link, the second communication link, or the third communication link is a cellular communication link, a near field communication (NFC) link, an evolved universal terrestrial radio access network (EUTRAN) communication link, a wireless metropolitan area networks (WMAN) communication link, a wireless local area network (WLAN) communication link, a wireless personal area network (WPAN) communication link, a mobile body area networks (MBAN) communication link, an infrared communication link, a satellite communication link, a Bluetooth® communication link, a ZigBee communication link, a Z-Wave communication link, or a worldwide interoperability for microwave access (WiMAX) communication link.

Example 28 may include the communication device of example 26 and/or some other examples herein, wherein the traffic is a data traffic, a voice traffic, or a multimedia traffic.

Example 29 may include the communication device of example 26 and/or some other examples herein, wherein the communication device is a wearable device, a smartphone, a computer tablet, a laptop, a desktop computer, a server, a game console, a set-top box, an infotainment console, an Internet of Things (IoT) device, or a sensor.

Example 30 may include the communication device of example 26 and/or some other examples herein, wherein the means for communicating the traffic further include: means for turning off the means for communicating with the first device through the first communication link, before communicating the traffic with the first device via the second device using the means for communicating with the second device through the second communication link.

Example 31 may include the communication device of any of examples 26-30 and/or some other examples herein, wherein the means for communicating the traffic further include: means for collecting a power usage information of the communication device; means for sending the power usage information to the second device; and means for obtaining an indication from the second device to communicate the traffic by the second communication link followed by the third communication link, before communicating the traffic by the second communication link followed by the third communication link.

Example 32 may include the communication device of any of examples 26-30 and/or some other examples herein, wherein the means for communicating the traffic further include: means for collecting a first power usage information of the communication device; means for obtaining a second power usage information of the second device; and means for determining, based on the first power usage information and the second power usage information, to communicate the traffic by the second communication link followed by the third communication link, before communicating the traffic by the second communication link followed by the third communication link.

Example 33 may include the communication device of example 32 and/or some other examples herein, wherein the means for determining is for determining to communicate the traffic by the second communication link followed by the third communication link based on a policy related to the first power usage information of the communication device, the second power usage information of the second device, a first user experience on the first communication link, and a second user experience on the second communication link.

Example 34 may include the communication device of example 33 and/or some other examples herein, wherein the policy is to communicate the traffic by the second communication link followed by the third communication link when the first power usage information indicates a first power level of the communication device is less than a first threshold, the second power usage information indicates a second power level of the second device is larger than a second threshold, and a signal on the second communication link is stronger than a third threshold.

Example 35 may include the communication device of example 34 and/or some other examples herein, wherein the first threshold, the second threshold, or the third threshold is configurable by a user of the communication device.

Example 36 may include the communication device of any of examples 26-30 and/or some other examples herein, wherein the traffic is a first traffic, the means for communicating the traffic is for communicating the first traffic with the first device by the second communication link followed by the third communication link, and the means for communicating the traffic further include: means for communicating a second traffic with the first device by the first communication link.

Example 37 may include a communication device, comprising: means for communicating with a first device through a first communication link; means for communicating with a second device through a second communication link, wherein the first device communicates with the second device through a third communication link, and the first device consumes more power to communicate with the second device on the third communication link than a power the first device consumes to communicate with the communication device on the first communication link; means for forwarding a first traffic to the second device on the second communication link, wherein the first traffic is from the first device through the first communication link; and means for forwarding a second traffic to the first device on the first communication link, wherein the second traffic is from the second device through the second communication link.

Example 38 may include the communication device of example 37 and/or some other examples herein, wherein the first communication link, the second communication link, or the third communication link is a cellular communication link, a near field communication (NFC) link, an evolved universal terrestrial radio access network (EUTRAN) communication link, a wireless metropolitan area networks (WMAN) communication link, a wireless local area network (WLAN) communication link, a wireless personal area network (WPAN) communication link, a mobile body area networks (MBAN) communication link, an infrared communication link, a satellite communication link, a Bluetooth® communication link, a ZigBee communication link, a Z-Wave communication link, or a worldwide interoperability for microwave access (WiMAX) communication link.

Example 39 may include the communication device of example 37 and/or some other examples herein, wherein the communication device is a wearable device, a smartphone, a computer tablet, a laptop, a desktop computer, a server, a game console, a set-top box, an infotainment console, an Internet of Things (IoT) device, or a sensor.

Example 40 may include the communication device of any of examples 37-39 and/or some other examples herein, further include: means for collecting a power usage information of the communication device; means for sending the power usage information to the first device; and means for obtaining an indication from the first device to forward the first traffic from the first device and to forward the second traffic to the first device.

Example 41 may include the communication device of any of examples 37-39 and/or some other examples herein, further include: means for collecting a first power usage information of the communication device; means for obtaining a second power usage information of the first device; and means for determining, based a policy related to the first power usage information, the second power usage information, a first user experience on the first communication link, and a second user experience on the third communication link, to forward the first traffic from the first device and to forward the second traffic to the first device.

Example 42 may include the communication device of example 41 and/or some other examples herein, wherein the policy is to forward the first traffic from the first device and to forward the second traffic to the first device when the first power usage information indicates a first power level of the communication device is larger than a first threshold, the second power usage information indicates a second power level of the first device is less than a second threshold, and a signal on the first communication link is stronger than a third threshold.

Example 43 may include the communication device of any of examples 37-39 and/or some other examples herein, wherein the communication device communicates with a third device by a fourth communication link, and the third device communicates with the second device by a fifth communication link, and the communication device further includes: means for forwarding the first traffic to the second device via the third device, through the fourth and fifth communication links, and wherein the second traffic is from the second device via the third device, through the fourth and fifth communication links.

Example 44 may include an apparatus for computing, comprising: a non-volatile memory; a first transceiver to communicate with a first device through a first communication link; a second transceiver to communicate with a second device through a second communication link, wherein the second device communicates with the first device through a third communication link, and the second transceiver for the second communication link consumes less power than a power the first transceiver consumes to communicate through the first communication link; a processor circuitry coupled with the memory, the first transceiver, and the second transceiver; and a communication manager to be loaded into the memory and executed by the processor circuitry to: communicate a traffic with the first device via the second device, through the second and third communication links, using the second transceiver.

Example 45 may include the apparatus of example 44 and/or some other examples herein, wherein the first communication link, the second communication link, or the third communication link is a cellular communication link, a near field communication (NFC) link, an evolved universal terrestrial radio access network (EUTRAN) communication link, a wireless metropolitan area networks (WMAN) communication link, a wireless local area network (WLAN) communication link, a wireless personal area network (WPAN) communication link, a mobile body area networks (MBAN) communication link, an infrared communication link, a satellite communication link, a Bluetooth® communication link, a ZigBee communication link, a Z-Wave communication link, or a worldwide interoperability for microwave access (WiMAX) communication link.

Example 46 may include the apparatus of example 44 and/or some other examples herein, wherein the traffic is a data traffic, a voice traffic, or a multimedia traffic.

Example 47 may include the apparatus of example 44 and/or some other examples herein, wherein the apparatus is a wearable device, a smartphone, a computer tablet, a laptop, a desktop computer, a server, a game console, a set-top box, an infotainment console, an Internet of Things (IoT) device, or a sensor.

Example 48 may include the apparatus of example 44 and/or some other examples herein, wherein the communication manager is further to: turn off the first transceiver and the first communication link, before communicating the traffic with the first device via the second device using the second transceiver.

Example 49 may include the apparatus of any of examples 44-48 and/or some other examples herein, wherein the communication manager is further to: collect a power usage information of the apparatus; send the power usage information to the second device; and obtain an indication from the second device to communicate the traffic by the second communication link followed by the third communication link, before communicating the traffic by the second communication link followed by the third communication link.

Example 50 may include the apparatus of any of examples 44-48 and/or some other examples herein, wherein the communication manager is further to: collect a first power usage information of the apparatus; obtain a second power usage information of the second device; and determine, based on the first power usage information and the second power usage information, to communicate the traffic by the second communication link followed by the third communication link, before communicating the traffic by the second communication link followed by the third communication link.

Example 51 may include the apparatus of example 50 and/or some other examples herein, wherein the communication manager is to determine to communicate the traffic by the second communication link followed by the third communication link based on a policy related to the first power usage information of the apparatus, the second power usage information of the second device, a first user experience on the first communication link, and a second user experience on the second communication link.

Example 52 may include the apparatus of example 51 and/or some other examples herein, wherein the policy is to communicate the traffic by the second communication link followed by the third communication link when the first power usage information indicates a first power level of the apparatus is less than a first threshold, the second power usage information indicates a second power level of the second device is larger than a second threshold, and a signal on the second communication link is stronger than a third threshold.

Example 53 may include the apparatus of example 52 and/or some other examples herein, wherein the first threshold, the second threshold, or the third threshold is configurable by a user of the apparatus.

Example 54 may include the apparatus of examples 44-48 and/or some other examples herein, wherein the traffic is a first traffic, the communication manager is to communicate the first traffic with the first device by the second communication link followed by the third communication link, and the communication manager is further to: communicate a second traffic with the first device by the first communication link.

Example 55 may include an apparatus, comprising: a memory; a first transceiver to communicate with a first device through a first communication link; a second transceiver to communicate with a second device through a second communication link, wherein the first device communicates with the second device through a third communication link, and the first device consumes more power to communicate with the second device on the third communication link than a power the first device consumes to communicate with the apparatus on the first communication link; a processor circuitry coupled with the memory, the first transceiver, and the second transceiver; and a communication manager to be loaded into the memory and executed by the processor circuitry to: forward a first traffic to the second device on the second communication link, wherein the first traffic is from the first device through the first communication link; and forward a second traffic to the first device on the first communication link, wherein the second traffic is from the second device through the second communication link.

Example 56 may include the apparatus of example 55 and/or some other examples herein, wherein the first communication link, the second communication link, or the third communication link is a cellular communication link, a near field communication (NFC) link, an evolved universal terrestrial radio access network (EUTRAN) communication link, a wireless metropolitan area networks (WMAN) communication link, a wireless local area network (WLAN) communication link, a wireless personal area network (WPAN) communication link, a mobile body area networks (MBAN) communication link, an infrared communication link, a satellite communication link, a Bluetooth® communication link, a ZigBee communication link, a Z-Wave communication link, or a worldwide interoperability for microwave access (WiMAX) communication link.

Example 57 may include the apparatus of example 55 and/or some other examples herein, wherein the apparatus is a wearable device, a smartphone, a computer tablet, a laptop, a desktop computer, a server, a game console, a set-top box, an infotainment console, an Internet of Things (IoT) device, or a sensor.

Example 58 may include the apparatus of any of examples 55-57 and/or some other examples herein, wherein the communication manager is further to: collect a power usage information of the apparatus; send the power usage information to the first device; and obtain an indication from the first device to forward the first traffic from the first device and to forward the second traffic to the first device.

Example 59 may include the apparatus of any of examples 55-57 and/or some other examples herein, wherein the communication manager is further to: collect a first power usage information of the apparatus; obtain a second power usage information of the first device; and determine, based a policy related to the first power usage information, the second power usage information, a first user experience on the first communication link, and a second user experience on the third communication link, to forward the first traffic from the first device and to forward the second traffic to the first device.

Example 60 may include the apparatus of example 59 and/or some other examples herein, wherein the policy is to forward the first traffic from the first device and to forward the second traffic to the first device when the first power usage information indicates a first power level of the apparatus is larger than a first threshold, the second power usage information indicates a second power level of the first device is less than a second threshold, and a signal on the first communication link is stronger than a third threshold.

Example 61 may include the apparatus of any of examples 55-57 and/or some other examples herein, wherein the apparatus communicates with a third device by a fourth communication link, and the third device communicates with the second device by a fifth communication link, and the communication manager is further to: forward the first traffic to the second device via the third device, through the fourth and fifth communication links, and wherein the second traffic is from the second device via the third device, through the fourth and fifth communication links.

Example 62 may include a method for a communication device, comprising: communicating a traffic with a first device via a second device, through a second communication link and a third communication link, using a second transceiver to communicate with the second device through the second communication link, wherein the communication device includes a first transceiver to communicate with the first device through a first communication link, and wherein the second device communicates with the first device through the third communication link, and the second transceiver consumes less power than a power the first transceiver consumes to communicate through the first communication link.

Example 63 may include the method of example 62 and/or some other examples herein, wherein the first communication link, the second communication link, or the third communication link is a cellular communication link, a near field communication (NFC) link, an evolved universal terrestrial radio access network (EUTRAN) communication link, a wireless metropolitan area networks (WMAN) communication link, a wireless local area network (WLAN) communication link, a wireless personal area network (WPAN) communication link, a mobile body area networks (MBAN) communication link, an infrared communication link, a satellite communication link, a Bluetooth® communication link, a ZigBee communication link, a Z-Wave communication link, or a worldwide interoperability for microwave access (WiMAX) communication link.

Example 64 may include the method of example 62 and/or some other examples herein, wherein the traffic is a data traffic, a voice traffic, or a multimedia traffic.

Example 65 may include the method of example 62 and/or some other examples herein, wherein the communication device is a wearable device, a smartphone, a computer tablet, a laptop, a desktop computer, a server, a game console, a set-top box, an infotainment console, an Internet of Things (IoT) device, or a sensor.

Example 66 may include the method of example 62 and/or some other examples herein, further including: turning off the first transceiver and the first communication link, before communicating the traffic with the first device via the second device using the means for communicating with the second device through the second communication link.

Example 67 may include the method of any of examples 62-66 and/or some other examples herein, further including: collecting a power usage information of the communication device; sending the power usage information to the second device; and obtaining an indication from the second device to communicate the traffic by the second communication link followed by the third communication link, before communicating the traffic by the second communication link followed by the third communication link.

Example 68 may include the method of any of examples 62-66 and/or some other examples herein, further including: collecting a first power usage information of the communication device; obtaining a second power usage information of the second device; and determining, based on the first power usage information and the second power usage information, to communicate the traffic by the second communication link followed by the third communication link, before communicating the traffic by the second communication link followed by the third communication link.

Example 69 may include the method of example 68 and/or some other examples herein, wherein the determining is to determine to communicate the traffic by the second communication link followed by the third communication link based on a policy related to the first power usage information of the communication device, the second power usage information of the second device, a first user experience on the first communication link, and a second user experience on the second communication link.

Example 70 may include the method of example 69 and/or some other examples herein, wherein the policy is to communicate the traffic by the second communication link followed by the third communication link when the first power usage information indicates a first power level of the communication device is less than a first threshold, the second power usage information indicates a second power level of the second device is larger than a second threshold, and a signal on the second communication link is stronger than a third threshold.

Example 71 may include the method of example 70 and/or some other examples herein, wherein the first threshold, the second threshold, or the third threshold is configurable by a user of the communication device.

Example 72 may include the method of any of examples 62-66 and/or some other examples herein, wherein the traffic is a first traffic, the method further includes: communicating a second traffic with the first device by the first communication link.

Example 73 may include a method for a communication device, comprising: communicating with a first device through a first communication link; communicating with a second device through a second communication link, wherein the first device communicates with the second device through a third communication link, and the first device consumes more power to communicate with the second device on the third communication link than a power the first device consumes to communicate with the communication device on the first communication link; forwarding a first traffic to the second device on the second communication link, wherein the first traffic is from the first device through the first communication link; and forwarding a second traffic to the first device on the first communication link, wherein the second traffic is from the second device through the second communication link.

Example 74 may include the method of example 73 and/or some other examples herein, wherein the first communication link, the second communication link, or the third communication link is a cellular communication link, a near field communication (NFC) link, an evolved universal terrestrial radio access network (EUTRAN) communication link, a wireless metropolitan area networks (WMAN) communication link, a wireless local area network (WLAN) communication link, a wireless personal area network (WPAN) communication link, a mobile body area networks (MBAN) communication link, an infrared communication link, a satellite communication link, a Bluetooth® communication link, a ZigBee communication link, a Z-Wave communication link, or a worldwide interoperability for microwave access (WiMAX) communication link.

Example 75 may include the method of example 73 and/or some other examples herein, wherein the communication device is a wearable device, a smartphone, a computer tablet, a laptop, a desktop computer, a server, a game console, a set-top box, an infotainment console, an Internet of Things (IoT) device, or a sensor.

Example 76 may include the method of any of examples 73-75 and/or some other examples herein, further including: collecting a power usage information of the communication device; sending the power usage information to the first device; and obtaining an indication from the first device to forward the first traffic from the first device and to forward the second traffic to the first device.

Example 77 may include the method of any of examples 73-75 and/or some other examples herein, further including: collecting a first power usage information of the communication device; obtaining a second power usage information of the first device; and determining, based a policy related to the first power usage information, the second power usage information, a first user experience on the first communication link, and a second user experience on the third communication link, to forward the first traffic from the first device and to forward the second traffic to the first device.

Example 78 may include the method of example 77 and/or some other examples herein, wherein the policy is to forward the first traffic from the first device and to forward the second traffic to the first device when the first power usage information indicates a first power level of the communication device is larger than a first threshold, the second power usage information indicates a second power level of the first device is less than a second threshold, and a signal on the first communication link is stronger than a third threshold.

Example 79 may include the method of any of examples 73-75 and/or some other examples herein, wherein the communication device communicates with a third device by a fourth communication link, and the third device communicates with the second device by a fifth communication link, and the method further includes: forwarding the first traffic to the second device via the third device, through the fourth and fifth communication links, and wherein the second traffic is from the second device via the third device, through the fourth and fifth communication links.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. A communication device, comprising:
a first transceiver to communicate with a first device through a first communication link;
a second transceiver to communicate with a second device through a second communication link, wherein the second device communicates with the first device through a third communication link, and the second transceiver for the second communication link consumes less power than a power the first transceiver consumes to communicate through the first communication link; and
a communication manager coupled to the first transceiver and the second transceiver to:
communicate a first traffic with the first device via the second device, when the first communication link and the second communication link are both turned on, through the second and third communication links, using the second transceiver, wherein the first traffic is a multimedia traffic; and
communicate a second traffic with the first device directly through the first communication link without going through the second device when the first communication link and the second communication link are both turned on, wherein the second traffic is an emergency or security traffic.

2. The communication device of claim 1, wherein the first communication link, the second communication link, or the third communication link is a cellular communication link, a near field communication (NFC) link, an evolved universal terrestrial radio access network (EUTRAN) communication link, a wireless metropolitan area network (WMAN) communication link, a wireless local area network (WLAN) communication link, a wireless personal area network (WPAN) communication link, a mobile body area network (MBAN) communication link, an infrared communication link, a satellite communication link, a Bluetooth communication link, a ZigBee communication link, a Z-Wave communication link, or a worldwide interoperability for microwave access (WiMAX) communication link.

3. The communication device of claim 1, wherein the first traffic is a data traffic, a voice traffic, or a multimedia traffic.

4. The communication device of claim 1, wherein the communication device is a wearable device, a smartphone, a computer tablet, a laptop, a desktop computer, a server, a game console, a set-top box, an infotainment console, an Internet of Things (IoT) device, or a sensor.

5. The communication device of claim 1, wherein the communication manager is further to:
turn off the first transceiver and the first communication link, before communicating the first traffic with the first device via the second device using the second transceiver.

6. The communication device of claim 1, wherein the communication manager is further to:
collect a power usage information of the communication device;

send the power usage information to the second device; and obtain an indication from the second device to communicate the first traffic by the second communication link followed by the third communication link, before communicating the first traffic by the second communication link followed by the third communication link.

7. The communication device of claim 1, wherein the communication manager is further to:

collect a first power usage information of the communication device;

obtain a second power usage information of the second device; and determine, based on the first power usage information and the second power usage information, to communicate the first traffic by the second communication link followed by the third communication link, before communicating the first traffic by the second communication link followed by the third communication link.

8. The communication device of claim 7, wherein the communication manager is to determine to communicate the first traffic by the second communication link followed by the third communication link based on a policy related to the first power usage information of the communication device, the second power usage information of the second device, a first user experience on the first communication link, and a second user experience on the second communication link.

9. The communication device of claim 8, wherein the policy is to communicate the first traffic by the second communication link followed by the third communication link when the first power usage information indicates a first power level of the communication device is less than a first threshold, the second power usage information indicates a second power level of the second device is larger than a second threshold, and a signal on the second communication link is stronger than a third threshold.

10. The communication device of claim 9, wherein the first threshold, the second threshold, or the third threshold is configurable by a user of the communication device.

11. A communication device, comprising:

a first transceiver to communicate with a first device through a first communication link;

a second transceiver to communicate with a second device through a second communication link, wherein the first device communicates with the second device through a third communication link, and the first device consumes more power to communicate with the second device on the third communication link than a power the first device consumes to communicate with the communication device on the first communication link, the first device is to communicate a third traffic with the second device directly on the third communication link without going through the communication device when the third communication link and the first communication link are both turned on, wherein the third traffic is an emergency or security traffic; and a communication manager coupled to the first transceiver and the second transceiver to:

forward a first traffic to the second device on the second communication link, wherein the first traffic is from the first device through the first communication link when the first communication link and the third communication link are both turned on for the first device, and the first traffic is a multimedia traffic; and forward a second traffic to the first device on the first communication link, wherein the second traffic is from the second device through the second communication link.

12. The communication device of claim 11, wherein the first communication link, the second communication link, or the third communication link is a cellular communication link, a near field communication (NFC) link, an evolved universal terrestrial radio access network (EUTRAN) communication link, a wireless metropolitan area network (WMAN) communication link, a wireless local area network (WLAN) communication link, a wireless personal area network (WPAN) communication link, a mobile body area network (MBAN) communication link, an infrared communication link, a satellite communication link, a Bluetooth communication link, a ZigBee communication link, a Z-Wave communication link, or a worldwide interoperability for microwave access (WiMAX) communication link.

13. The communication device of claim 11, wherein the communication device is a wearable device, a smartphone, a computer tablet, a laptop, a desktop computer, a server, a game console, a set-top box, an infotainment console, an Internet of Things (IoT) device, or a sensor.

14. The communication device of claim 11, wherein the communication manager is further to:

collect a power usage information of the communication device;

send the power usage information to the first device; and obtain an indication from the first device to forward the first traffic from the first device and to forward the second traffic to the first device.

15. The communication device of claim 11, wherein the communication manager is further to:

collect a first power usage information of the communication device;

obtain a second power usage information of the first device; and determine, based a policy related to the first power usage information, the second power usage information, a first user experience on the first communication link, and a second user experience on the third communication link, to forward the first traffic from the first device and to forward the second traffic to the first device.

16. The communication device of claim 15, wherein the policy is to forward the first traffic from the first device and to forward the second traffic to the first device when the first power usage information indicates a first power level of the communication device is larger than a first threshold, the second power usage information indicates a second power level of the first device is less than a second threshold, and a signal on the first communication link is stronger than a third threshold.

17. The communication device of claim 11, wherein the communication device communicates with a third device by a fourth communication link, and the third device communicates with the second device by a fifth communication link, and the communication manager is further to:

forward the first traffic to the second device via the third device, through the fourth and fifth communication links, and wherein the second traffic is from the second device via the third device, through the fourth and fifth communication links.

18. One or more non-transitory computer-readable media comprising instructions that cause a communication device, in response to execution of the instructions by the communication device, to:

communicate a first traffic with a first device by a second communication link followed by a third communication link when a first communication link and the second communication link are both turned on, wherein the second communication link is between the communication device and a second device, the third communication link is between the second device and the first device, the first communication link is between the communication device and the first device, the communication device consumes more power to communicate with the first device on the first communication link to the first device than a power the communication device consumes to communicate with the second device on the second communication link, wherein the first traffic is a multimedia traffic; and communicate a second traffic with the first device directly through the first communication link without going through the second device when the first communication link and the second communication link are both turned on, wherein the second traffic is an emergency or security traffic.

19. The one or more non-transitory computer-readable media of claim 18, wherein the communication device is further caused to:

turn off the first communication link between the communication device and the first device, before communicating the first traffic with the first device by the second communication link followed by the third communication link.

20. The one or more non-transitory computer-readable media of claim 18, wherein the communication device is further caused to:

collect a power usage information of the communication device;

send the power usage information to the second device; and obtain an indication from the second device to communicate the first traffic by the second communication link followed by the third communication link.

21. The one or more non-transitory computer-readable media of claim 18, wherein the communication device is further caused to:

collect a first power usage information of the communication device;

obtain a second power usage information of the second device; and determine, based a policy related to the first power usage information, the second power usage information, a first user experience on the first communication link, and a second user experience on the third communication link, to communicate the first traffic by the second communication link followed by the third communication link.

22. The one or more non-transitory computer-readable media of claim 21, wherein the policy is to communicate the first traffic by the second communication link followed by the third communication link when the first power usage information indicates a first power level of the communication device is less than a first threshold, the second power usage information indicates a second power level of the second device is larger than a second threshold, and a signal on the second communication link is stronger than a third threshold.

23. The one or more non-transitory computer-readable media of claim 22, wherein the first threshold, the second threshold, or the third threshold is configurable by a user of the communication device.

\* \* \* \* \*